United States Patent
Cho

(10) Patent No.: US 10,263,658 B2
(45) Date of Patent: Apr. 16, 2019

(54) PROTECTIVE COVER AND ELECTRONIC DEVICE HAVING IT

(71) Applicant: Samsung Electronics Co., Ltd., Gyeonggi-do (KR)

(72) Inventor: Byung-Hun Cho, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/107,976

(22) PCT Filed: Dec. 26, 2014

(86) PCT No.: PCT/KR2014/012925
§ 371 (c)(1),
(2) Date: Jun. 24, 2016

(87) PCT Pub. No.: WO2015/099502
PCT Pub. Date: Jul. 2, 2015

(65) Prior Publication Data
US 2016/0323004 A1    Nov. 3, 2016

(30) Foreign Application Priority Data

Dec. 27, 2013 (KR) .................. 10-2013-0165722

(51) Int. Cl.
*H04M 1/725* (2006.01)
*H04B 1/3888* (2015.01)
(Continued)

(52) U.S. Cl.
CPC ........ *H04B 1/3888* (2013.01); *H04M 1/0262* (2013.01); *H04M 1/0277* (2013.01);
(Continued)

(58) Field of Classification Search
CPC ............ A45C 2011/002; H04B 1/3883; H04B 1/3888; H01M 2/1016; H01M 2/1022;
(Continued)

(56) References Cited

U.S. PATENT DOCUMENTS 5,678,203 A * 10/1997 Miyazawa ........... H04B 1/3816
455/186.1
6,535,199 B1 * 3/2003 Canova, Jr. ........... G06F 1/1626
345/156
(Continued)

FOREIGN PATENT DOCUMENTS

| CN | 1996498 | 7/2007 |
| CN | 103221897 | 7/2013 |

(Continued)

OTHER PUBLICATIONS

PCT/ISA/237 Written Opinion issued on PCT/KR2014/012925 (pp. 5).

(Continued)

*Primary Examiner* — Duc M Nguyen
(74) *Attorney, Agent, or Firm* — The Farrell Law Firm, P.C.

(57) ABSTRACT

A protective cover and an electronic device having it are provided. The protective cover for receiving and protecting at least part of an electronic device includes a first case frame comprising a mounting surface for mounting the electronic device, a second case frame for forming an exterior of the protective cover by combining with the first case frame, and at least one electronic component interposed between the first case frame and the second case frame and electrically connected to the electronic device. Thus, the electronic device can be protected from an external impact or a foreign substance, and various additional functions can be performed in aid of the electronic device.

19 Claims, 14 Drawing Sheets

(51) Int. Cl.
  G06F 1/16 (2006.01)
  H04M 1/02 (2006.01)
  A45C 11/00 (2006.01)
  H04B 1/3883 (2015.01)
(52) U.S. Cl.
  CPC ... H04M 1/72527 (2013.01); *A45C 2011/002* (2013.01); *G06F 1/1628* (2013.01); *H04B 1/3883* (2013.01)
(58) Field of Classification Search
  CPC .......... H01M 2/72527; G06F 1/1601–1/1698; H04M 1/0262; H04M 1/72527
  USPC ...................................... 455/575.8
  See application file for complete search history.

(56) References Cited

U.S. PATENT DOCUMENTS

| | | | |
|---|---|---|---|
| 7,907,394 B2 | 3/2011 | Richardson et al. | |
| 8,763,802 B2* | 7/2014 | Ellis-Brown | G06F 1/1628 206/320 |
| D759,004 S * | 6/2016 | Stevinson | D14/250 |
| 9,411,213 B2* | 8/2016 | Ellis-Brown | G06F 1/1628 |
| 9,503,146 B1* | 11/2016 | Chen | H04B 1/3888 |
| 9,634,520 B2* | 4/2017 | Yamanaka | H02J 7/355 |
| 2004/0174137 A1* | 9/2004 | Kim | H04M 1/0208 320/114 |
| 2005/0116684 A1* | 6/2005 | Kim | B60R 11/0241 320/114 |
| 2007/0152633 A1 | 7/2007 | Lee | |
| 2008/0268963 A1 | 10/2008 | Deutchman | |
| 2009/0009945 A1* | 1/2009 | Johnson | G06F 1/1613 361/679.27 |
| 2010/0124040 A1* | 5/2010 | Diebel | G06F 1/1628 361/816 |
| 2011/0203956 A1* | 8/2011 | Deutchman | A45C 11/00 206/320 |
| 2012/0118772 A1 | 5/2012 | Ellis-Brown | |
| 2012/0187192 A1* | 7/2012 | Lee | G06K 7/10891 235/462.44 |
| 2012/0294469 A1* | 11/2012 | Weaver, III | H04R 1/2857 381/334 |
| 2012/0303520 A1* | 11/2012 | Huang | H01M 10/46 705/39 |
| 2013/0020425 A1* | 1/2013 | Grassi | B65H 75/4431 242/388 |
| 2013/0084919 A1* | 4/2013 | Glynn | H01M 10/465 455/566 |
| 2013/0109316 A1* | 5/2013 | Lee | H04M 1/725 455/41.2 |
| 2013/0199948 A1* | 8/2013 | Lebauer | B65D 81/02 206/216 |
| 2013/0314030 A1* | 11/2013 | Fathollahi | H02J 7/0045 320/107 |
| 2014/0099526 A1* | 4/2014 | Powell | H01M 2/1066 429/100 |
| 2014/0105441 A1* | 4/2014 | Kroupa | B65H 75/4434 381/370 |
| 2014/0192995 A1* | 7/2014 | Cataldo | H04R 1/1033 381/74 |
| 2014/0210803 A1* | 7/2014 | Oh | G09G 3/20 345/207 |
| 2015/0189058 A1 | 7/2015 | Hwang | |

FOREIGN PATENT DOCUMENTS

| | | |
|---|---|---|
| JP | 2007026920 | 2/2007 |
| KR | 101195649 | 10/2012 |
| KR | 10-1246726 | 3/2013 |
| KR | 101246726 | 3/2013 |
| KR | 200467455 | 6/2013 |
| KR | 101327940 | 11/2013 |
| WO | WO 2011056036 | 5/2011 |
| WO | WO 2012/170964 | 12/2012 |

OTHER PUBLICATIONS

PCT/ISA/210 Search Report issued on PCT/KR2014/012925 (pp. 3).
European Search Report dated Jul. 11, 2017 issued in counterpart application No. 14873819.8-1874, 5 pages.
Chinese Office Action dated May 3, 2018 issued in counterpart application No. 201480071317.2, 22 pages.
Chinese Office Action dated Oct. 12, 2018 issued in counterpart application No. 201480071317.2, 20 pages.
European Search Report dated Jan. 2, 2019 issued in counterpart application No. 14873819.Aug. 1220, 5 pages.
Chinese Office Action dated Jan. 18, 2019 issued in counterpart application No. 201480071317.2, 22 pages.
Indian Office Action dated Feb. 20, 2019 issued in counterpart application No. 201617023707, 6 pages.

* cited by examiner

[Fig. 1]
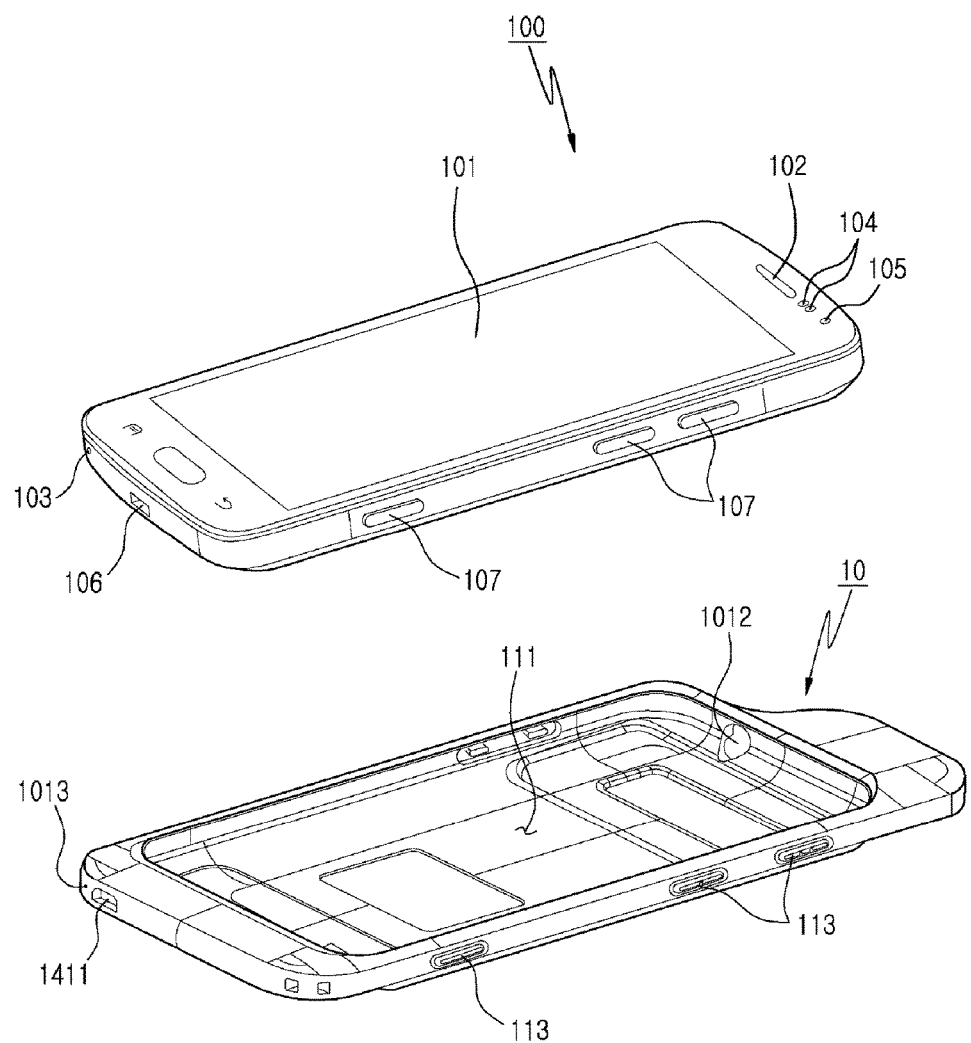

[Fig. 2a]
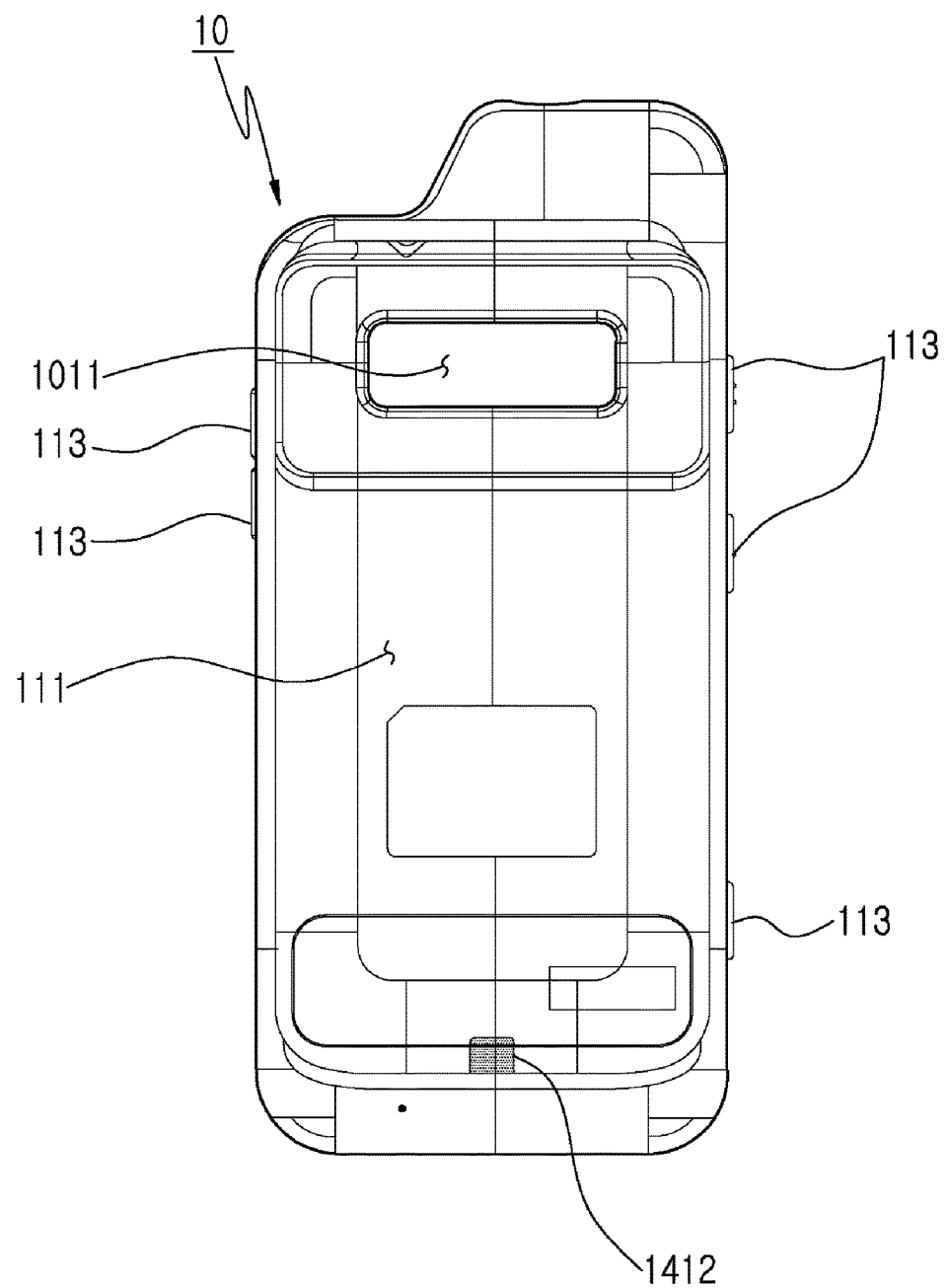

[Fig. 2b]
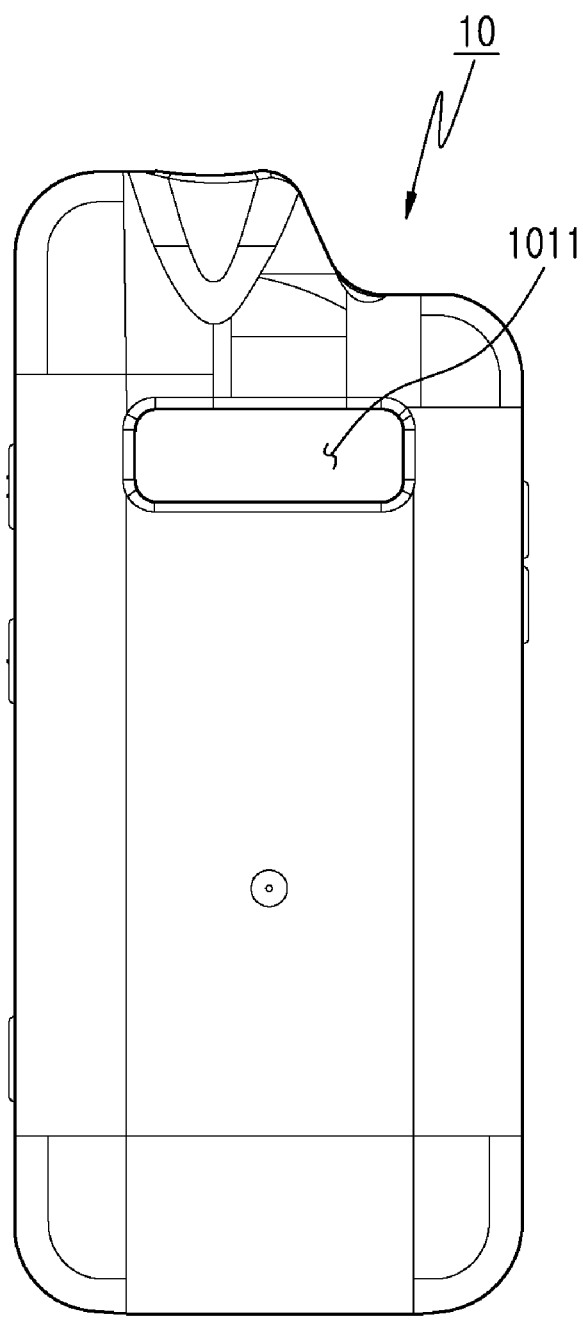

[Fig. 2c]
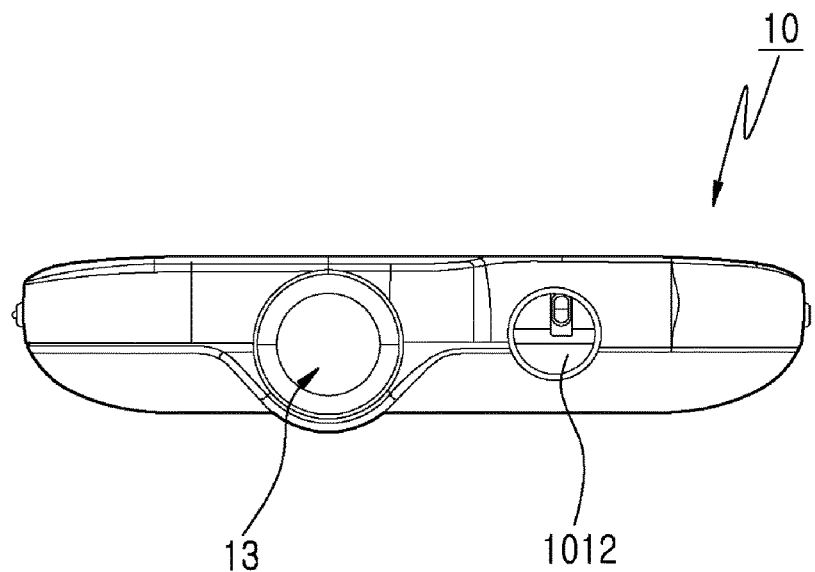
[Fig. 2d]
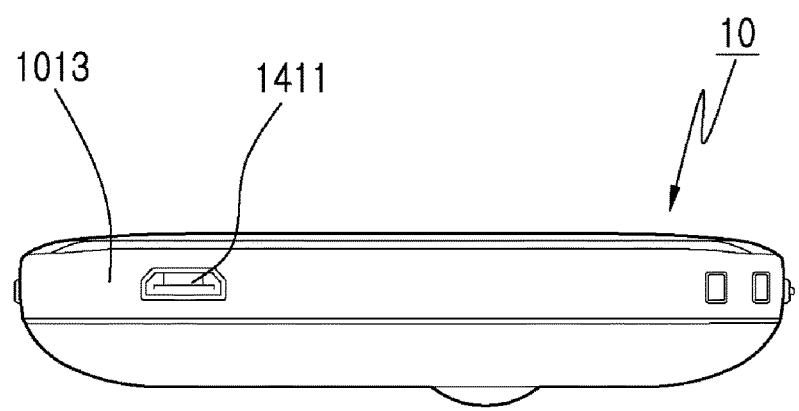

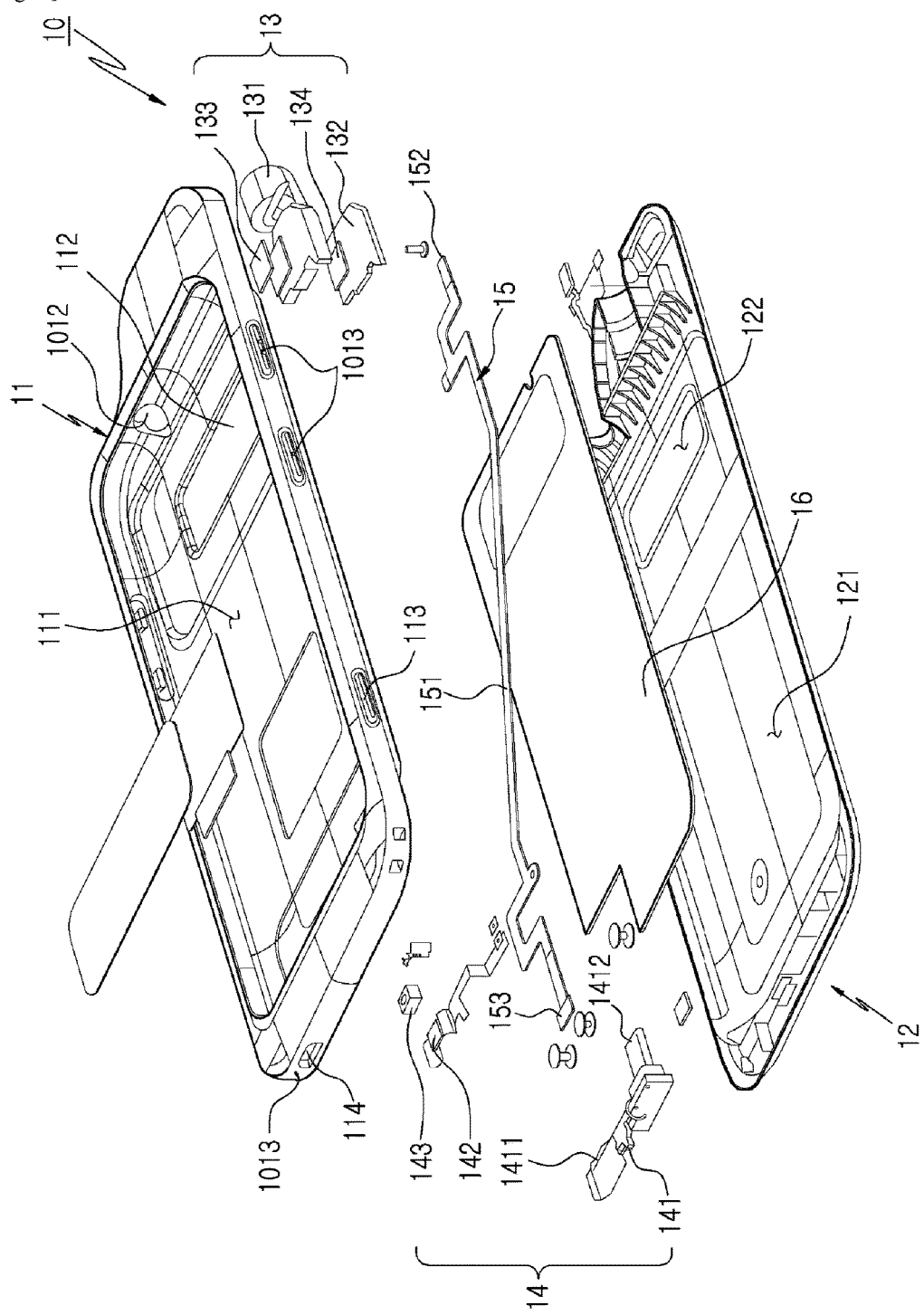
[Fig. 3]

[Fig. 4a]
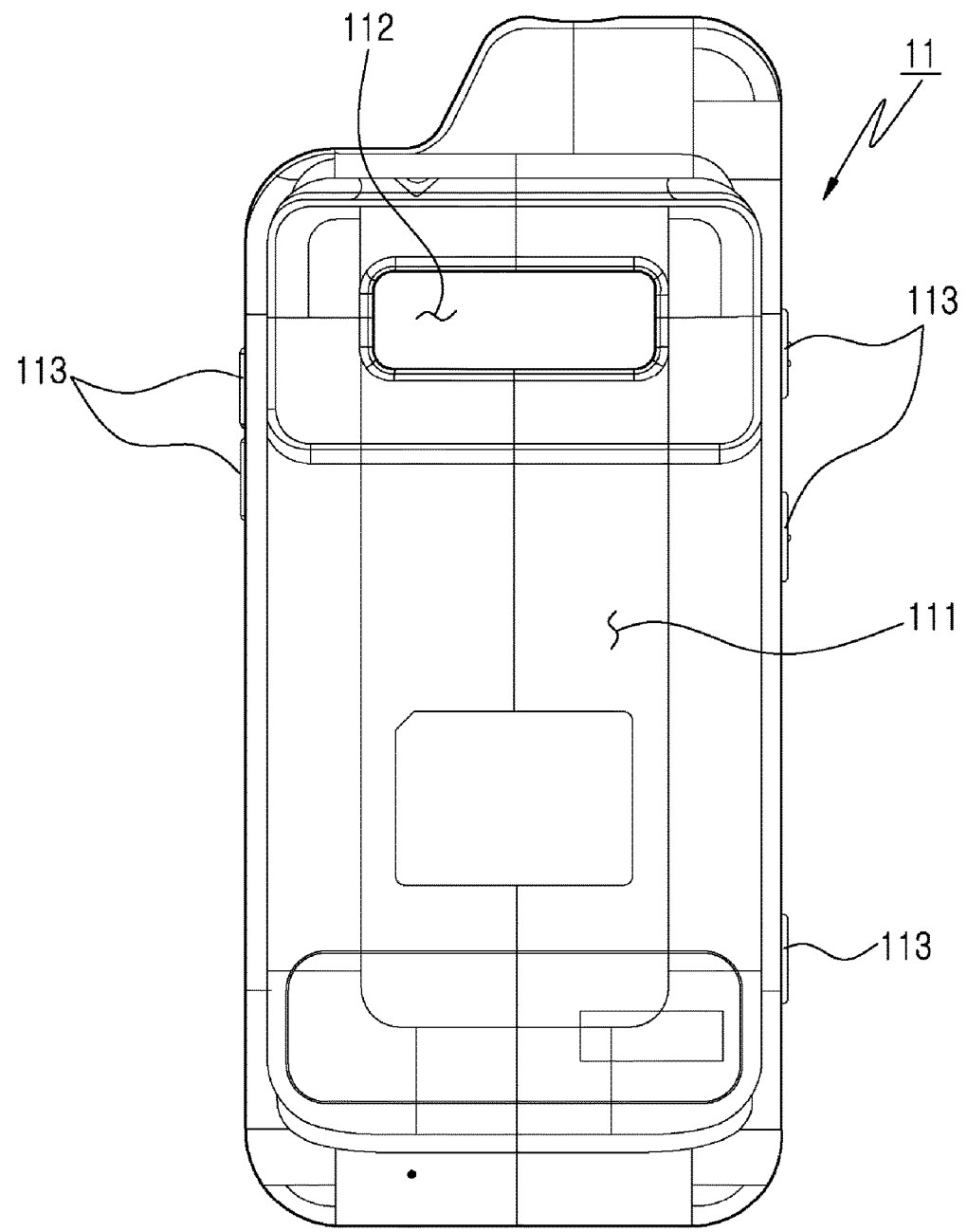

[Fig. 4b]
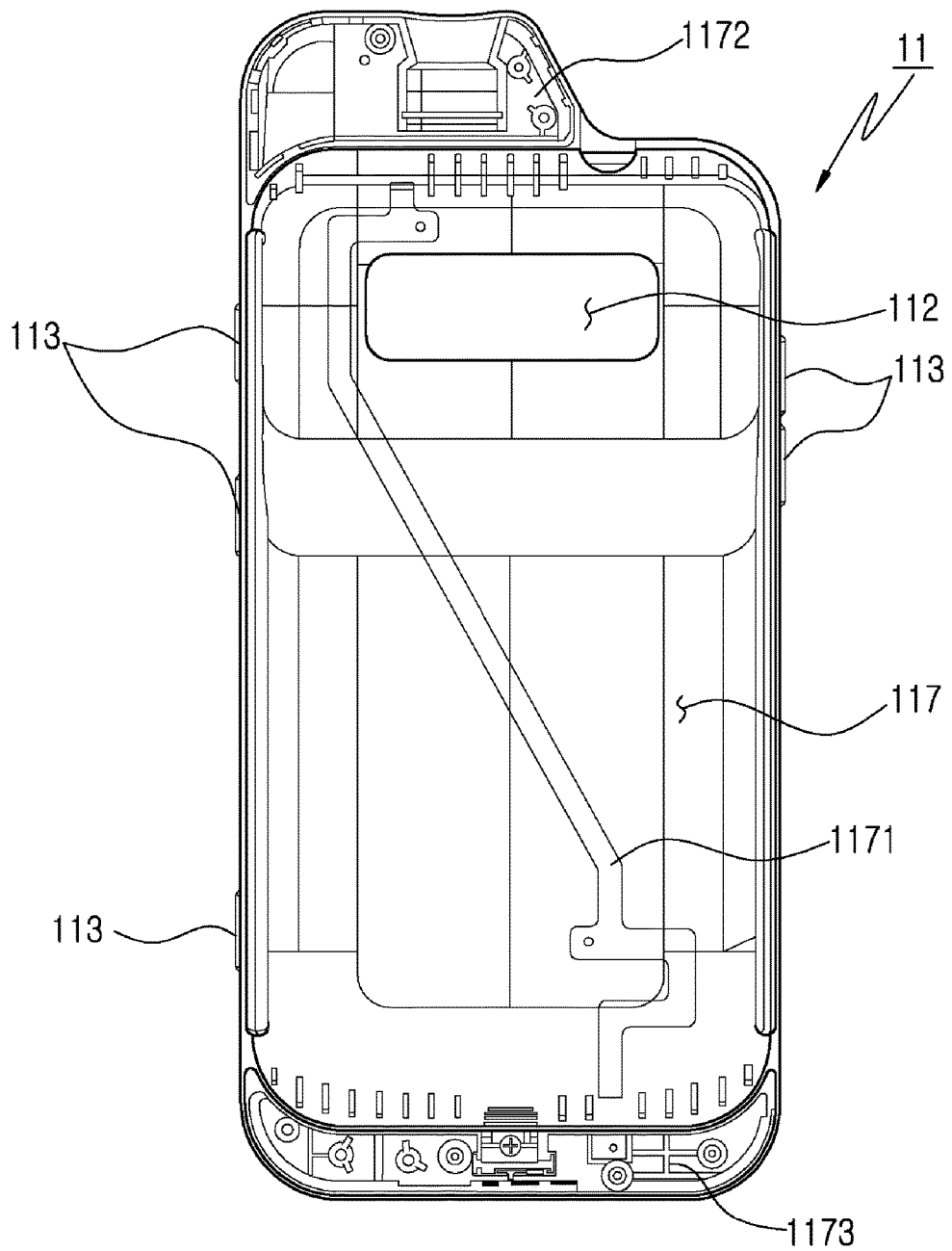

[Fig. 5a]
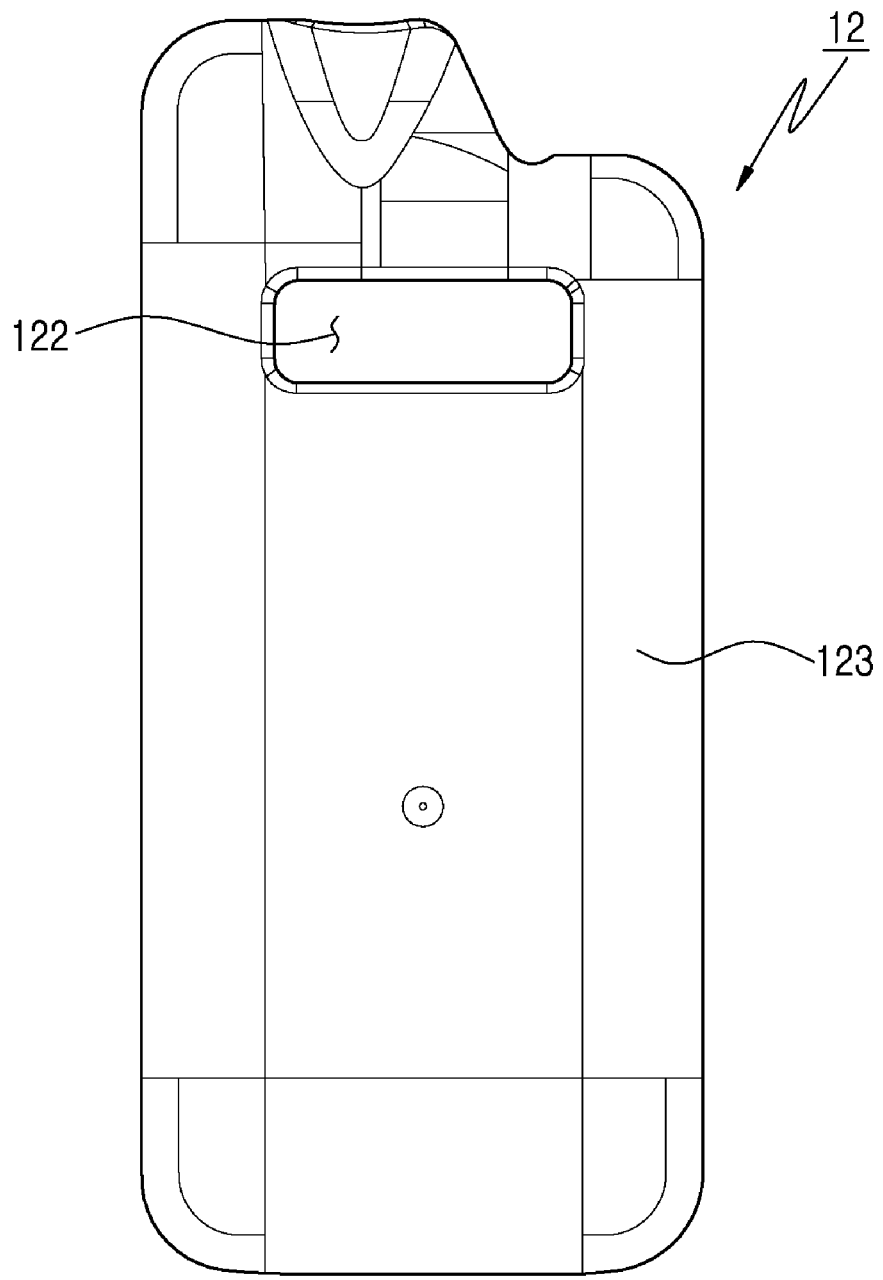

[Fig. 5b]
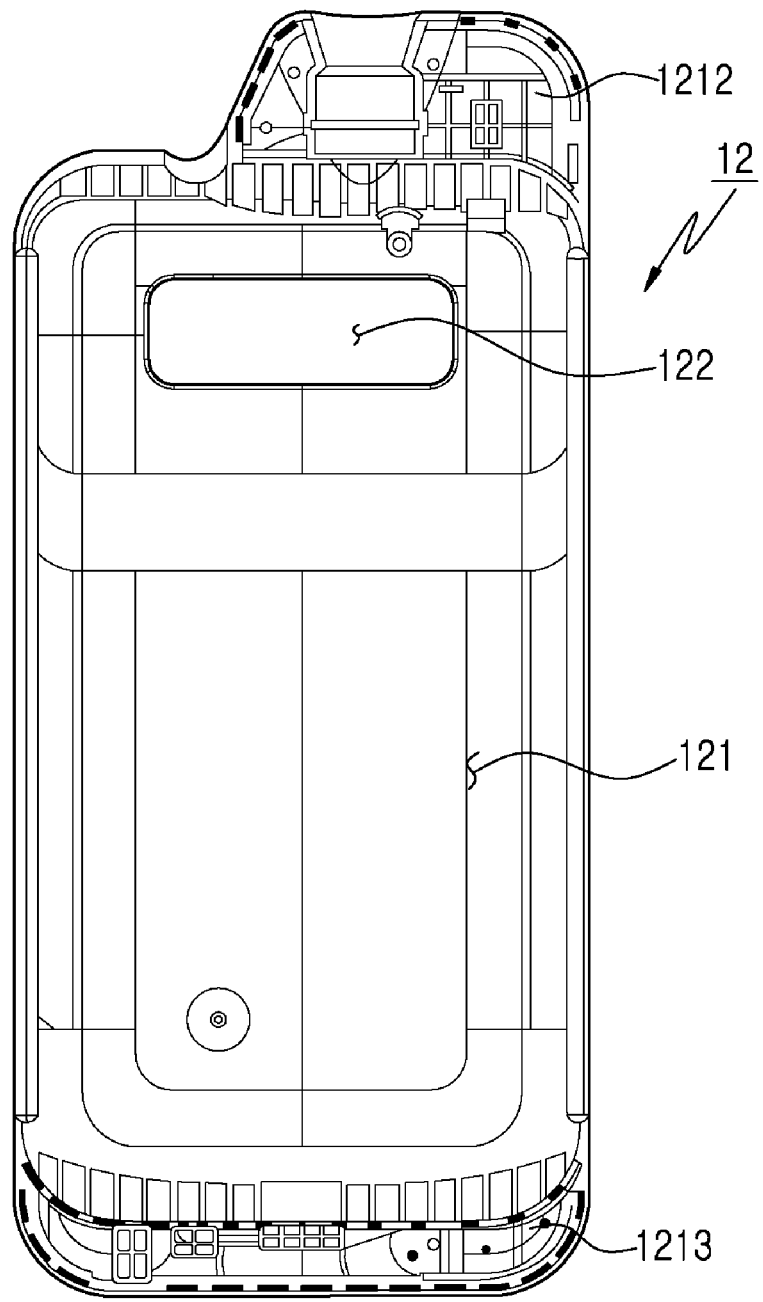

[Fig. 6a]
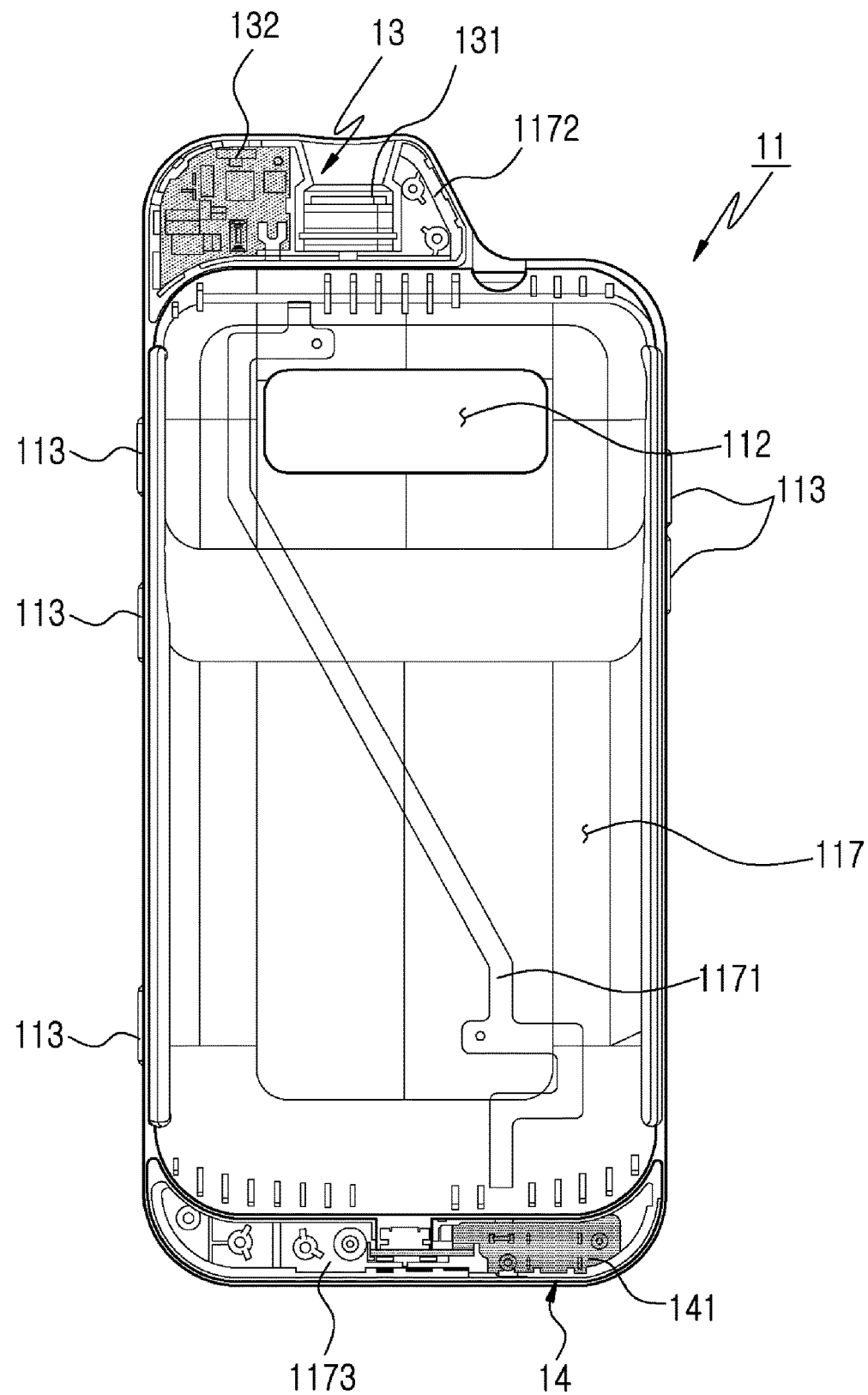

[Fig. 6b]
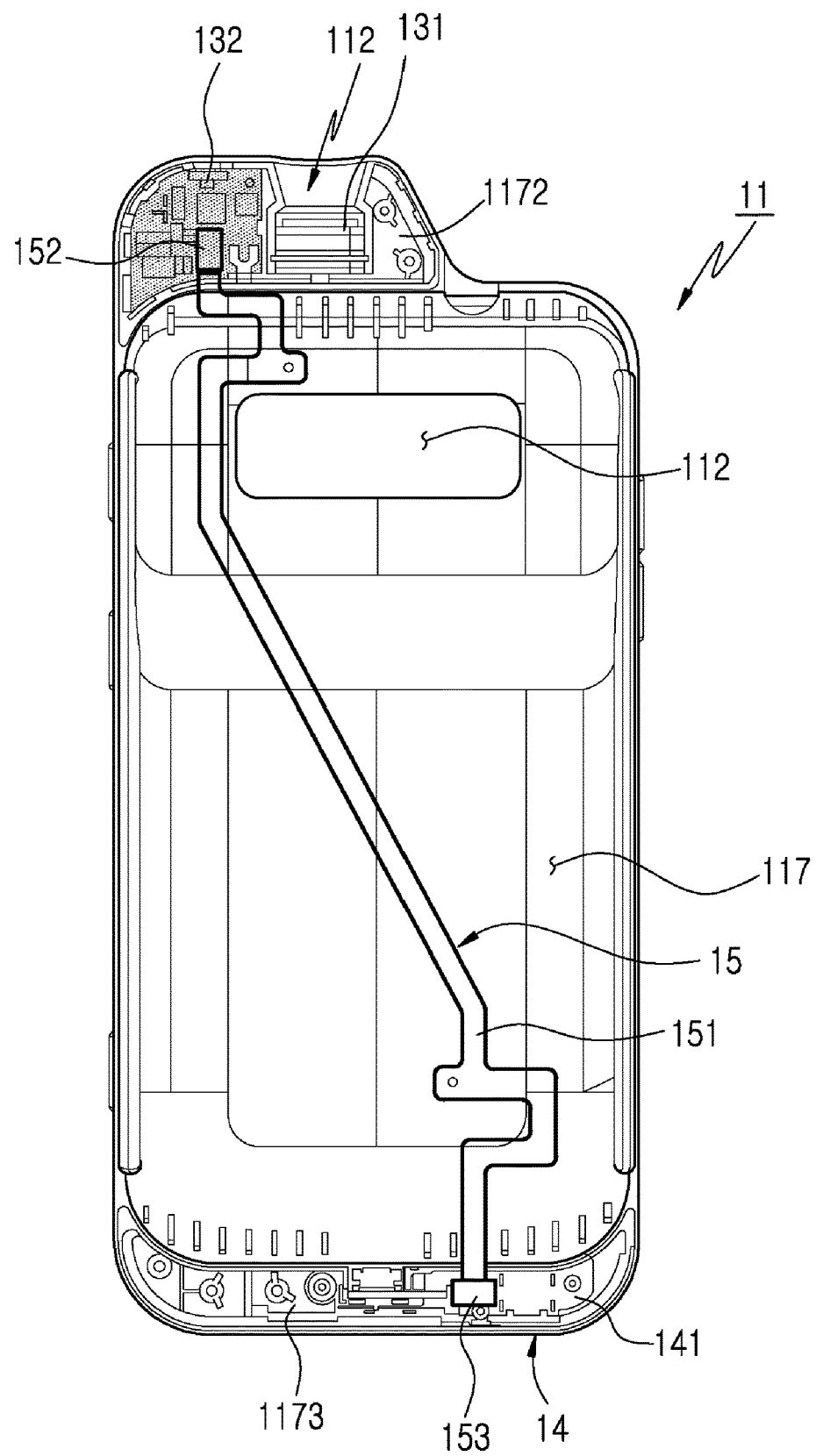

[Fig. 7]
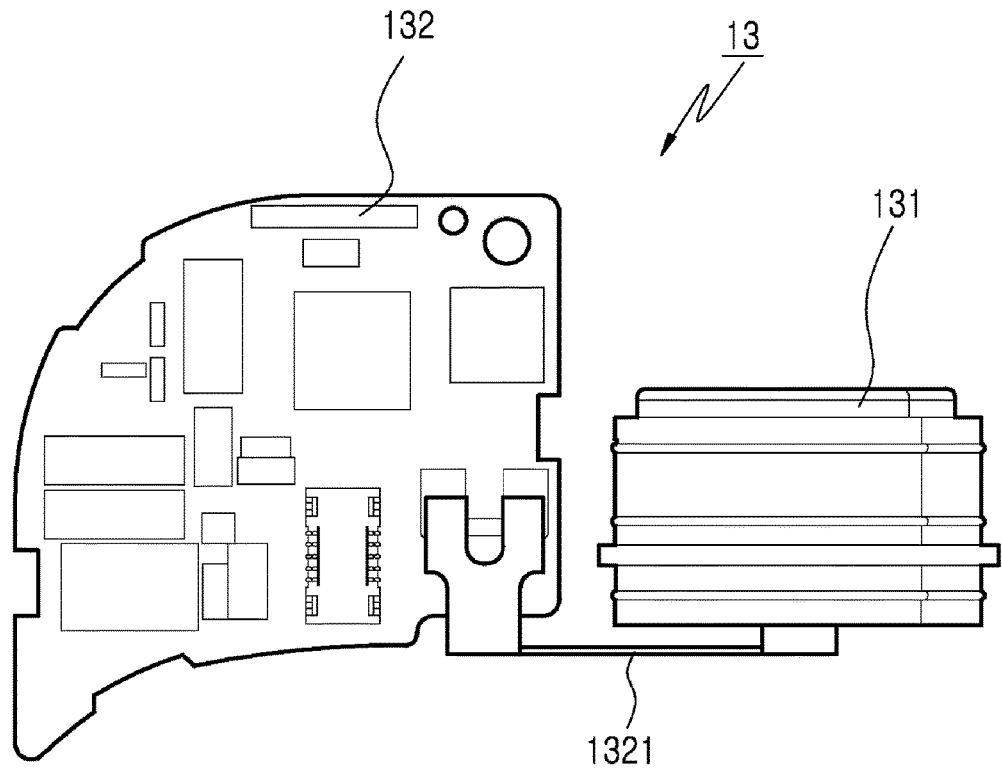
[Fig. 8a]
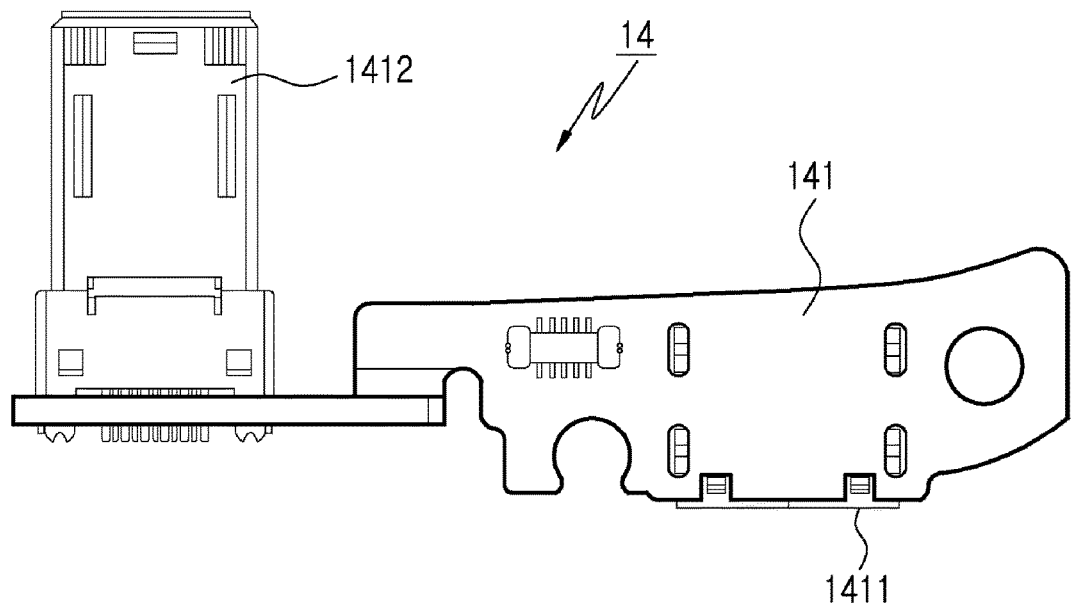

[Fig. 8b]
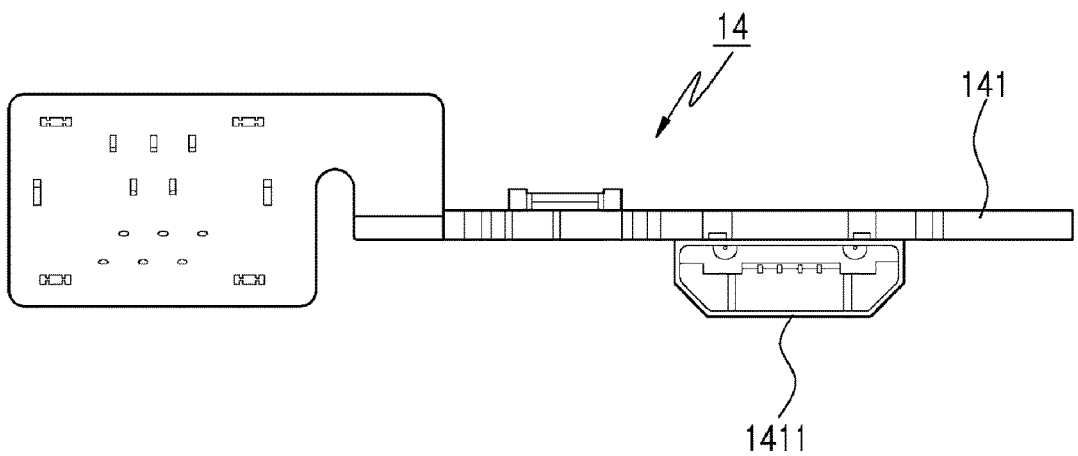

[Fig. 9]
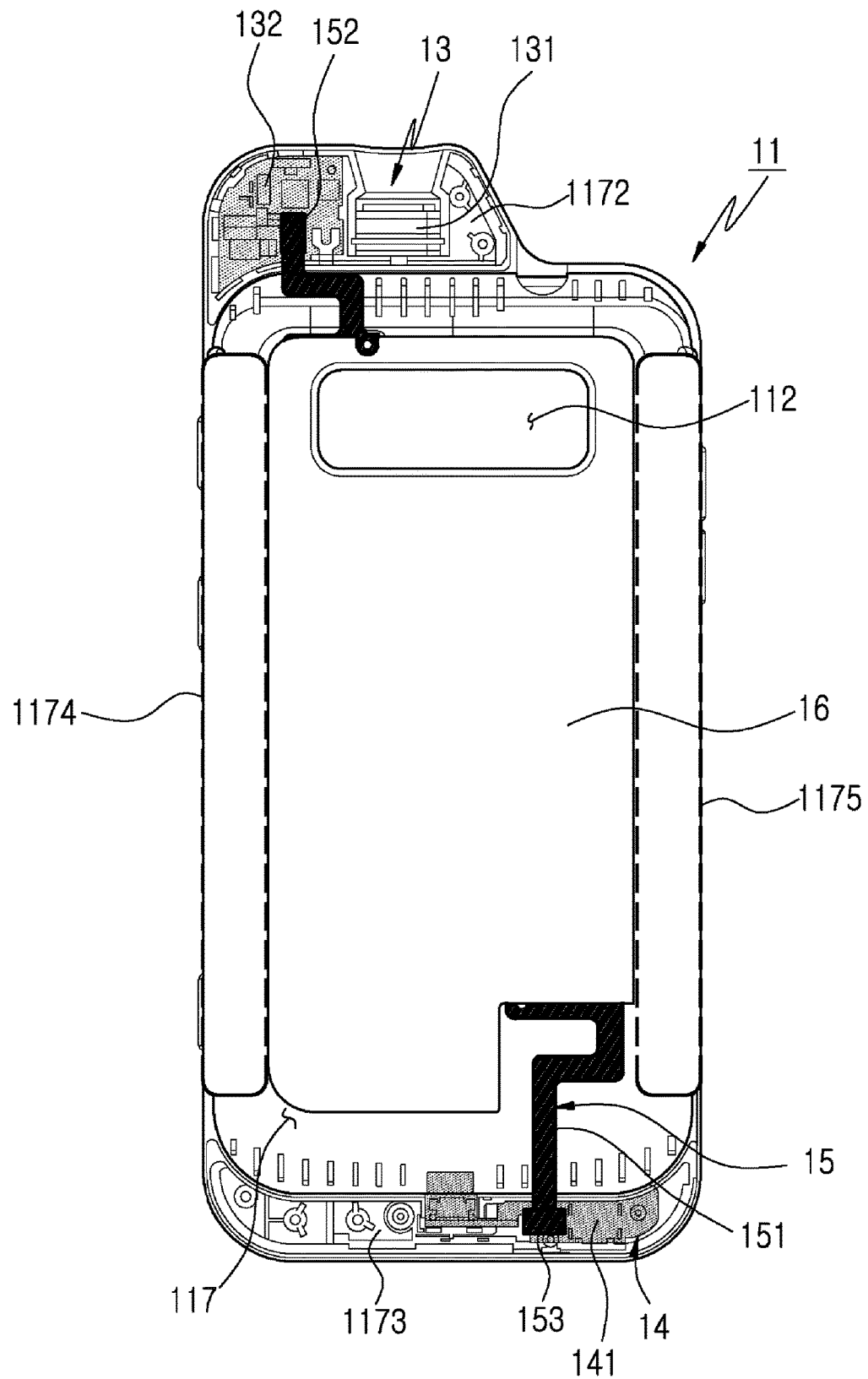

PROTECTIVE COVER AND ELECTRONIC DEVICE HAVING IT

PRIORITY

This application is a National Phase Entry of PCT International Application No. PCT/KR2014/012925, which was filed on Dec. 26, 2014, and claims priority to Korean Patent Application No. 10-2013-0165722, which was filed on Dec. 27, 2013, the contents of each of which are incorporated herein by reference.

TECHNICAL FIELD

The present disclosure relates to a protective cover and an electronic device having it.

BACKGROUND ART

While a portable electronic device is generally diversified in its function, a more portable device has more competitive power. For example, even with the same function, a slimmer, lighter, and simpler portable electronic device is preferred. Accordingly, portable electronic device manufacturers are developing slimmer, lighter, and simpler electronic devices than other projects, with the same or better performance.

Following this trend, electronic devices are miniaturized and their cost is rising. Consumers who purchase the high-priced electronic device put the electronic device in a separate protective cover in order to protect an exterior of the electronic device and to maximize the grip. The protective cover is formed of a material which can be attached to one side of the electronic device or can cover the whole device excluding a display device.

However, such a protective cover merely protects the electronic device or decorates the exterior, and more functions are nonexistent.

DISCLOSURE OF INVENTION

Solution to Problem

To address the above-discussed deficiencies of the prior art, it is a primary aspect of the present disclosure to provide a protective cover and an electronic device having it.

Another aspect of the present disclosure is to provide a protective cover including at least one additional function to assist an electronic device, and the electronic device having it.

Yet another aspect of the present disclosure is to provide a protective cover for performing a function of an electronic device without having to remove the protective cover, and the electronic device having it.

Still another aspect of the present disclosure is to provide a protective cover for protecting an exterior of an electronic device and concurrently performing various additional functions.

According to one aspect of the present disclosure, a protective cover for receiving and protecting at least part of an electronic device includes a first case frame comprising a mounting surface for receiving the electronic device; a second case frame for forming an exterior of the protective cover by combining with the first case frame; and at least one electronic component interposed between the first case frame and the second case frame and electrically connected to the electronic device. An electronic device comprises the protective cover.

According to another aspect of the present disclosure, a protective cover for receiving and protecting at least part of an electronic device includes a first case frame comprising a mounting surface for receiving the electronic device; a second case frame for forming an exterior of the protective cover by combining with the first case frame; and at least one electronic component interposed between the first case frame and the second case frame and comprising a connector module comprising a connector substrate; a cover connector mounted on the connector substrate, protruding in the mounting surface, and electrically connected to a connector port of the mounted electronic device; a cover connector port mounted on the connector substrate, exposed outwards from the protective cover, and connected to an external device, an ultrasonic sensor module interposed between the first case frame and the first case frame and receiving power and a control signal of the electronic device through the connector module, and at least one electrical connecting member for electrically connecting the ultrasonic sensor module and the connector module. An electronic device comprises the protective cover.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF DRAWINGS

The above and other aspects, features, and advantages of certain exemplary embodiments of the present disclosure will be more apparent from the following description taken in conjunction with the accompanying drawings, in which:

FIG. 1 is a perspective view of an electronic device applied to a protective cover according to an exemplary embodiment of the present disclosure;

FIGS. 2A through 2D are views of the protective cover according to an exemplary embodiment of the present disclosure;

FIG. 3 is an exploded view of the protective cover according to an exemplary embodiment of the present disclosure;

FIGS. 4A and 4B are views of a first case frame of the protective cover according to an exemplary embodiment of the present disclosure;

FIGS. 5A and 5B are views of a second case frame of the protective cover according to an exemplary embodiment of the present disclosure;

FIGS. 6A and 6B are views of electronic components applied to the first case frame according to an exemplary embodiment of the present disclosure;

FIGS. 7 through 8B are views of electronic components applied to the protective cover according to an exemplary embodiment of the present disclosure; and FIG. 9 is a view of combining of the first and second case frames for assembly according to an exemplary embodiment of the present disclosure.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide, but not limited to, a portable electronic communication device including a display. However, exemplary embodiments of the present disclosure can be applied to various electronic devices including the display. Exemplary embodiments of the present disclosure can be also applied to a portable electronic device without the display.

Exemplary embodiments of the present disclosure can be applied to various electronic devices including a display in a front side, for example, various electronic devices such as Personal Digital Assistant (PDA), laptop computer, mobile phone, smart phone, netbook, Mobile Internet Device (MID), Ultra Mobile Personal Computer (UMPC), tablet PC, navigation, MP3, and wearable electronic device.

Exemplary embodiments of the present disclosure can be applied to various protective covers to which the electronic device can be mounted. According to an exemplary embodiment, the protective cover can cover only a side and a rear side of the electronic device. According to an exemplary embodiment, the protective cover may cover only the rear side of the electronic device. According to an exemplary embodiment, the protective cover may be applied as a battery cover which is attached and detached to and from the rear side of the electronic device. According to an exemplary embodiment, the protective cover may cover the rear side, the side, and at least part of a front side of the electronic device.

FIG. 1 is a perspective view of an electronic device applied to a protective cover according to an exemplary embodiment of the present disclosure.

Referring to FIG. 1, an electronic device 100 can be mounted to a protective cover 10. According to an exemplary embodiment, the electronic device 100 can be inserted to a mounting surface 111 of the protective cover 10.

According to an exemplary embodiment, a display 101 is installed in the front side of the electronic device 100, a speaker device 102 for receiving a voice of other party is installed above the display 101, a microphone device 103 for sending a voice of an electronic device user to the other party is installed below the display 101, and thus the electronic device 100 can perform a basic communication function. The display 101 can employ a touch screen device for conducting input and output in the same area.

According to an exemplary embodiment, components for performing various functions of the electronic device 100 can be arranged around the speaker device 102 of the electronic device. Such components can include a video communication camera device 105 for Video Telephony (VT) with the other party. Also, at least one sensor module 104 can be installed to variably operate the electronic device 100 according to a surrounding environment. The sensor module 104 can include a light sensor for detecting an ambient light and automatically controlling a brightness of the display 101 according to the detected light value and/or a proximity sensor for deactivating the display 101 when detecting a user's head portion attached during a phone call.

According to an exemplary embodiment, a plurality of key buttons 107 is exposed in the side of the electronic device 100 to perform the corresponding function of the electronic device 100. According to an exemplary embodiment, the key button 107 can be a mechanical button operating with a metal dome or a tact switch.

According to an exemplary embodiment, a connector port 106 can be exposed in a bottom side of the electronic device 100. The connector port 106 can be electrically connected with a connector of a data cable for data communication, or electrically connected to a connector of a charging device such as TA to charge a battery pack of the electronic device 100.

According to an exemplary embodiment, the protective cover 10 can include the mounting surface 111 for receiving the electronic device 100. The mounting surface 111 can be formed in a depth for receiving the rear side and at least part of the side of the electronic device 100. According to an exemplary embodiment, the side of the protective cover 10 can include a plurality of cover buttons 113. The cover button 113 is disposed at a position corresponding to the key button 107 in the side of the electronic device 100, and can physically press the corresponding key button 107 of the electronic device 100 mounted in the mounting surface 111 according to a pressing operation.

According to an exemplary embodiment, a cover connector port 1411 can be disposed in an outer bottom side of the protective cover 10. Hence, when the connector of the charging device or the data cable is connected to the cover connector port 1411, the electronic device 100 can be electrically connected without having to separate the electronic device 100 from the protective cover 10 and separately connecting the electronic device 100.

According to an exemplary embodiment, a microphone guide hole 1013 can be formed in a side of the cover connector port 1411. The microphone guide hole 1013 is disposed at a position corresponding to the microphone device 103 of the electronic device 100 to transfer a voice or a sound from the outside to the microphone device 103 of the electronic device 100 through the microphone guide hole 1013.

Though a location of the microphone guide hole and a location of the microphone device of the electronic device are different, the sound may be collected by a modification of the structure of cover.

According to an exemplary embodiment, an ear plug through hole 1012 can be formed in part of a top side of the protective cover 10. The ear plug through hole 1012 is disposed at a position corresponding to an earjack hole (not shown) of the electronic device 100. An ear plug of a microphone device (or a headset) can be directly insert into an earjack hole of the electronic device 100 through the ear plug through hole 1012 of the protective cover 10 even when the electronic device 100 is mounted to the protective cover 10, without having to detach the electronic device 100 from the protective cover 10 and separately connecting it.

According to an exemplary embodiment, the protective cover 10 can protect the exterior of the electronic device 10 and concurrently provide various additional functions. According to an exemplary embodiment, the protective cover 10 can receive power of the electronic device 100 and perform the corresponding function of at least one electronic component of the protective cover 10. According to an exemplary embodiment, the electronic component can employ various components at a proper position, such as various sensor modules, speaker module, microphone module, vibrator, antenna module, projector module, and connector module for data exchange and charging, which can be operated under control of the electronic device. According to an exemplary embodiment, various sensor modules can use at least one of various sensor modules such as ultrasonic sensor, temperature sensor, atmospheric pressure sensor, odorant sensor, light sensor, and proximity sensor.

Hereafter, the structure of the protective cover 10 is explained in detail.

FIGS. 2A through 2D depict the protective cover being assembled according to an exemplary embodiment of the present disclosure. FIG. 2A is a front view of the protective cover, FIG. 2B is a back view of the protective cover, FIG. 2C is a plane view of the protective cover, and FIG. 2D is a bottom view of the protective cover.

Referring to the drawings, the front side of the protective cover 10 can include an opening 1011. The opening 1011 can be used to expose a camera module disposed at the back of the electronic device 100, or to expose a manufacturer logo of the electronic device 100.

According to an exemplary embodiment, the protective cover 10 can include a cover connector 1412 protruding toward the mounting surface 111. When the electronic device 100 is mounted to the mounting surface 111 of the protective cover 10, the cover connector 1412 can be inserted into the connector port 106 of the electronic device 100 and electrically connected to the electronic device 100.

According to an exemplary embodiment, the cover connector port 1411 can be exposed at the bottom side of the protective cover 10. The cover connector port 1411 can be electrically connected to the cover connector 1412 in the protective cover 10. Thus, when the connector of the external data cable or the connector of the charging device is connected to the cover connector port 1411, it can be electrically connected to the electronic device 100 through the cover connector 1412. According to an exemplary embodiment, the microphone guide hole 1013 can be formed in a side of the cover connector port 1411.

According to an exemplary embodiment, the sensor module can be exposed at the top of the protective cover 10. The sensor module can employ, but not limited to, an ultrasonic sensor module 13. For example, the electronic device 100 can employ various operable sensor modules. According to an exemplary embodiment, the ear plug through hole 1012 can be disposed in one side of the sensor module.

According to an exemplary embodiment, at least one electronic component (the connector module, the sensor module, etc.) disposed in the protective cover 10 can receive the power from the electronic device 100 and be controlled by the electronic device 100. Hence, the protective cover 10 can employ an electrical connecting member 15 (FIG. 3) for receiving and sending the power and a control signal from the electronic device 100 to the electronic components. The electrical connecting member shall be explained in detail.

FIG. 3 is an exploded view of the protective cover according to an exemplary embodiment of the present disclosure.

Referring to FIG. 3, the protective cover 10 can include a first case frame 11, a second case frame 12 coupled to the first case frame 11, a plurality of electronic components 13 and 14 interposed between the first case frame 11 and the second case frame 12, and the electrical connecting member 15 for electrically interconnecting the electronic components to be electrically connected to the electronic device 100.

According to an exemplary embodiment, the first case frame 11 can include a first opening 112 at a position corresponding to a second opening 122 of the second case frame 12 so as to form the opening 1011 of the protective cover 100. According to an exemplary embodiment, the ear plug through hole 1012 can be formed above the mounting surface 111. According to an exemplary embodiment, a port exposure hole 114 can be formed in an outer bottom side of the protective cover 10 to expose the cover connector port 1411 of the mounted connector module 14. According to an exemplary embodiment, a plurality of cover buttons 113 can protrude along an outer side of the first case frame 11. The cover button 113 is disposed at a position corresponding to the key button 107 formed in the side of the electronic device 100, and can physically press the corresponding key button 107 of the electronic device 100 mounted in the mounting surface 111 according to the pressing operation.

According to an exemplary embodiment, the second case frame 12 can include a second opening 122 at a position corresponding to the first opening 112 of the first case frame 11 so as to form the opening 1011 of the protective cover 10. According to an exemplary embodiment, the second case frame 12 can be coupled to the first case frame 11 to secure the interposed electronic components 13 and 14 and the electrical connecting member 15. All of the electronic components 13 and 14 and the electrical connecting member 15 are installed in, but not limited to, the first case frame 11, and the second case frame 12 secures the electronic components 13 and 14 and the electrical connecting member 15 installed to the first case frame 11. For example, the electronic components 13 and 14 and the electrical connecting member 15 may be installed in the second case frame 12, and secured by the assembly of the first case frame 11 and the second case frame 12.

According to an exemplary embodiment, the electrical connecting member 15 can be disposed in a frame engaging surface 117 (FIG. 4B) of the first case frame 11. The electrical connecting member 15 can be, but not limited to, a Flexible Printed Circuit (FPC) electrically connected to the electronic components 13 and 14. The electrical connecting member 15 can use various well-known electrical connecting member such as thin cable. According to an exemplary embodiment, one electrical connecting member 15 crossing in the longitudinal direction of the protective cover 10 can be used to electrically connect the ultrasonic sensor module 13 and the connector module 14 disposed in the top side and the bottom side of the protective cover 10. According to an exemplary embodiment, a body 151 of the electrical connecting member 15 can be disposed in the longitudinal direction of the protective cover 10, a first end 152 can be electrically connected to the ultrasonic sensor module 13, and a second end 153 can be electrically connected to the connector module 14. The present disclosure is not limited to the one electrical connecting member, and a plurality of electrical connecting member electrically connectable may be equipped.

According to an exemplary embodiment, the electronic components 13 and 14 can employ at the proper position various components such as various sensor modules, speaker module, microphone module, vibrator, antenna module, projector module, and connector module for the data exchange and the charging, which can be operated under control of the electronic device 100. According to an exemplary embodiment, various sensor modules can use at least one of various sensor modules such as ultrasonic sensor, temperature sensor, atmospheric pressure sensor, odorant sensor, light sensor, and proximity sensor.

FIGS. 7 through 8B are views of the electronic components applied to the protective cover according to an exemplary embodiment of the present disclosure.

Referring to FIG. 7, the electronic component can include the ultrasonic sensor module 13. According to an exemplary embodiment, the ultrasonic sensor module 13 can include an ultrasonic sensor 131, a sensor substrate 132 spaced from the ultrasonic sensor 131, and an FPC 1321 for electrically connecting the ultrasonic sensor 131 and the sensor substrate 132. According to an exemplary embodiment, the ultrasonic sensor module 13 can expose the ultrasonic sensor 131, but not limited to, at the top of the protective cover 10. The ultrasonic sensor module 13 may be disposed at various exposable positions of the protective cover 10. According to an exemplary embodiment, the sensor substrate 132 may include a pair of shield cans 133 and 134 of FIG. 3 as a noise shield.

Referring to FIG. 8A and FIG. 8B, the electronic component can include the connector module 14. The connector module 14 can include the cover connector port 1411 and the cover connector 1412 spaced from the connector substrate 141. The cover connector port 1411 can be exposed through the port exposure hole 114 of the first case frame 11 of the protective cover 10. The cover connector 1412 can protrude from the first case frame 11 of the protective cover 10 toward the mounting surface 111. According to an exemplary embodiment, the connector module 14 can electrically connect the external data cable or the charging device with the electronic device 100 mounted in the protective cover 10. According to an exemplary embodiment, as shown in FIG. 3, the protective cover 10 can further include a bracket 142 of a SUS material to fix the connector module 14 to the first case frame 11. According to an exemplary embodiment, the protective cover may further include an elastic member (e.g., a spring) for supporting the bracket 142. According to an exemplary embodiment, the cover connector port 1411 and the cover connector 1412 can be mounted on the connector substrate using a Surface Mounted Device (SMD) process or a soldering process.

According to an exemplary embodiment, a double-sided tape 16 can be applied between the first case frame 11 and the second case frame 12. The double-sided tape 16 can not only combine the first case frame 11 and the second case frame 12 but also secure the electrical connecting member 15 disposed in the frame engaging surface 117 of the first case frame 11.

According to an exemplary embodiment, the first case frame 11 and the second case frame 12 can be injected using a synthetic resin of a substantially flexible material. According to an exemplary embodiment, the first and second case frames 11 and 12 can be formed of, but not limited to, at least one material of rubber, urethane, and silicon. The first and second case frames 11 and 12 can be formed of a PC material. According to an exemplary embodiment, corresponding areas 1172 and 1173 (FIG. 4B) of the first case frame 11 which secures the electronic components can be formed of a harder material than the first case frame 11. Such a material can include the PC material. According to an exemplary embodiment, the first case frame 11 and the electronic component mounting areas 1172 and 1173 formed of different materials can be formed using double injection. According to an exemplary embodiment, the electronic component mounting areas 1172 and 1173 can be injected first using a relatively harder material, and then the first case frame 11 can be injected.

According to an exemplary embodiment, although it is not depicted, a plurality of screws, a screw, or a sponge washer may be applied to secure each electronic component to the corresponding case frame.

According to an exemplary embodiment, although it is not depicted, the protective cover 10 may further include various sheets.

FIGS. 4A and 4B are views of the first case frame of the protective cover according to an exemplary embodiment of the present disclosure.

Referring to FIGS. 4A and 4B, the mounting surface 111 for mounting the electronic device 100 can be formed in the front side of the first case frame 11. Also, the frame engaging surface 117 of the first case frame 11 can include a guide slit 1171 for guiding the electrical connecting member in the longitudinal direction. According to an exemplary embodiment, the guide slit 1171 can be formed in a recess shape having a surface lower than the frame engaging surface 117, extended to the first electronic component mounting part 1172 with one end, and extended to the second electronic component mounting part 1173 with the other end.

According to an exemplary embodiment, the first electronic component mounting part 1172 can include, but not limited to, the ultrasonic sensor module 13, and the second electronic component mounting part 1173 can include, but not limited to, the connector module 14, and vice versa.

According to an exemplary embodiment, the first and second electronic component mounting parts 1172 and 1173 of the first case frame 11 can be formed of the PC material double-injected with the case frame of the flexible material. This is to prevent an arbitrary movement of the electronic components after their installation and to securely fix the electronic components.

FIGS. 5A and 5B are views of the second case frame of the protective cover according to an exemplary embodiment of the present disclosure.

Referring to FIGS. 5A and 5B, the second case frame 12 can include a front side 123 which forms the exterior of the protective cover 10, and a rear side 121 which is combined with the first case frame 11. The rear side 121 can include a first fusion bonding part 1212 at a position corresponding to the first electronic component mounting part 1172 of the first case frame 11, and a second fusion bonding part 1213 at a position corresponding to the second electronic component mounting part 1173. According to an exemplary embodiment, the first fusion bonding part 1212 and the second fusion bonding part 1213 can be also double-injected using the PC material. According to an exemplary embodiment, the first case frame 11 and the second case frame 12 can be combined by, but not limited to, ultrasonic welding a dotted portion of the first fusion bonding part 1212 and the second fusion bonding part 1213 of FIG. 5B. The first electronic component mounting part 1172 and the second electronic component mounting part 1173 of the first case frame 11 can be combined by, but not limited to, bonding the first fusion bonding part 1212 and the second fusion bonding part 1213 of the second case frame 12. They may be combined using a snap-fit structure according to their design.

FIGS. 6A and 6B are views of electronic components applied to the first case frame according to an exemplary embodiment of the present disclosure.

In FIG. 6A, the ultrasonic sensor module 13 is installed in the first electronic component mounting part 1172 of the frame engaging surface 117 of the first case frame 11, and the connector module 14 is installed in the second electronic component mounting part 1173.

Referring to FIG. 6A, the sensor substrate 132 and the ultrasonic sensor 131 can installed in the first electronic component mounting part 1172 at a certain interval. The ultrasonic sensor 131 can be installed while being exposed outwards from the protective cover 10. When the first case frame 11 is assembled with the second case frame 12, the sensor substrate 132 can be secured inside without being exposed to the outside of the protective cover 10.

According to an exemplary embodiment, the sensor substrate 132 can be fixed to the first electronic component mounting part 1172 of the PC material double-injected from the first case frame 11 using, but not limited to, at least one screw. The sensor substrate 132 may be fixed using the double-sided tape or the bonding.

According to an exemplary embodiment, likewise, the connector substrate 141 of the connector module 14 can be fixed to the second electronic component mounting part 1173 of the PC material double-injected from the first case frame 11 using, but not limited to, at least one screw. The connector substrate 141 may be fixed using the double-sided tape or the bonding. Likewise, except for the cover connector port 1411 and the cover connector 1412, the connector substrate 141 can be secured inside the protective cover 10 without being exposed.

In FIG. 6B, the electrical connecting member 15 is disposed in the guide slit 1171 of the frame engaging surface 117 of the first case frame 11.

Referring to FIG. 6B, the electrical connecting member 15 can adopt the FPC. According to an exemplary embodiment, the body 151 of the electrical connecting member 15 is received in the guide slit 1171. In this case, it is preferred that the electrical connecting member 15 does not protrude from at least the frame engaging surface 117.

According to an exemplary embodiment, the one end 152 of the electrical connecting member 15 can be electrically connected to the sensor substrate 132 in the first electronic component mounting part 1172, and the other end 153 can be electrically connected to the connector substrate 141 in the second electronic component mounting part 1173. According to an exemplary embodiment, the FPC used as the electrical connecting member 15 can be electrically connected to each substrate 132 and 142 using the soldering or the connector.

FIG. 9 is a view of the combining of the first and second case frames for the assembly according to an exemplary embodiment of the present disclosure.

Referring to FIG. 9, a fixing structure of the first case frame 11 for combining with the second case frame 12 is shown. According to an exemplary embodiment, the first electronic component mounting part 1172 and the second electronic component mounting part 1173 can be fixed with edges of the first fusion bonding part 1212 and the second fusion bonding part 1213 of the second electronic case frame 12 along the edges using the ultrasonic fusion. According to an exemplary embodiment, the frame engaging surface 117 of the first case frame 11 and the front side 121 of the second case frame 12 can be fixed by the double-sided tape 16. According to an exemplary embodiment, both sides 1174 and 1175 of the first case frame 11 can be fixed with both sides of the second case frame 12 using the bonding.

According to an exemplary embodiment, the ultrasonic fusion, the double-sided tape, and the boding process may be switched, or at least one of the three processes may be applied to the entire case frame.

According to an exemplary embodiment, the protective cover can not only protect the electronic device from an external impact or a foreign substance but also perform various additional functions in aid of the electronic device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A protective cover, comprising:
   a first case frame having a front side and an opposing back side, and comprising a mounting surface on the front side for mounting an electronic device;
   a second case frame having a front side and an opposing back side, the front side of the second case frame being configured to be coupled with the back side of the first case frame, and the back side of the second case frame forming a back surface of the protective cover;
   a plurality of electronic components interposed between the back side of the first case frame and the front side of the second case frame, each of the plurality of electronic components being separate from the electronic device and electrically connecting to the electronic device while fixedly disposed within the protective cover when the electronic device is mounted in the mounting surface; and
   an electrical connecting member for connecting the plurality of electronic components and disposed behind the mounting surface between the back side of the first case frame and the front side of the second case frame,
   wherein the plurality of electronic components are disposed directly adjacent to the back side of the first case frame,
   wherein the electrical connecting member is mounted in a guide slit formed in the back side of the first case frame, without protruding from the back side of the first case frame, and
   wherein the plurality of electronic components include an ultrasonic sensor module.

2. The protective cover of claim 1, wherein the plurality of electronic components comprise a connector module,
   wherein the connector module comprises,
   a connector substrate;
   a cover connector mounted on the connector substrate, protruding in the mounting surface, and electrically connected to a connector port of the mounted electronic device; and
   a cover connector port mounted on the connector substrate, exposed outwards from the protective cover, and connected to an external device.

3. The protective cover of claim 2, wherein the external device connected to the cover connector port conducts at least one of data exchange with the electronic device, charging of the electronic device, and power reception from the electronic device, through the cover connector.

4. The protective cover of claim 2, wherein the plurality of electronic components comprise at least one sensor module which is interposed between the first case frame and the second case frame, receives power and a control signal of the electronic device through the connector module, and includes the ultrasonic sensor module.

5. The protective cover of claim 4, wherein the sensor module and the connector module are electrically connected by the electrical connecting member.

6. The protective cover of claim 5, wherein the electrical connecting member is a Flexible Printed Circuit (FPC) attached to a frame engaging surface of the first case frame.

7. The protective cover of claim 6, wherein the electrical connecting member is mounted in the guide slit formed in the frame engaging surface of the first case frame, without protruding from the frame engaging surface.

8. The protective cover of claim 2, wherein the plurality of electronic components comprise at least one of a sensor module, a speaker module, a microphone module, a vibrator, an antenna module, a projector module, and a connector module for data exchange and charging, which are interposed between the first case frame and the second case frame and receives power and a control signal of the electronic device through the connector module.

9. The protective cover of claim 1, wherein the first case frame and the second case frame are formed of at least one flexible material of rubber, silicon, and urethane.

10. The protective cover of claim 1, wherein a mounting part of the first and second case frames in which the plurality of electronic components is disposed is double-injected using a relatively harder material than the other part of the first and second case frames.

11. The protective cover of claim 10, wherein the first case frame and the second case frame are formed of at least one flexible material of rubber, silicon, and urethane, and a mounting part of the first and second case frames in which the plurality of electronic components is disposed is double-injected using a PC material.

12. The protective cover of claim 1, wherein a sound guide holder is interposed between the first and second case frames corresponding to a microphone device of the electronic device, to guide a sound input through a port exposure hole of the first case frame to the microphone device of the electronic device.

13. The protective cover of claim 1, wherein the protective cover is a battery cover detachably disposed in a rear side of the electronic device.

14. A covered electronic device comprising:
an electronic device; and
a protective cover comprising:
 a first case frame having a front side and an opposing back side, and comprising a mounting surface on the front side in which the electronic device is mounted;
 a second case frame having a front side and an opposing back side, the front side of the second case frame being configured to be coupled with the back side of the first case frame, and the back side of the second case frame forming a back surface of the protective cover;
 a plurality of electronic components interposed between the back side of the first case frame and the front side of the second case frame, each of the plurality of electronic components being separate from the electronic device and electrically connecting to the electronic device while fixedly disposed within the protective cover when the electronic device is mounted in the mounting surface; and
 an electrical connecting member for connecting the plurality of electronic components and disposed behind the mounting surface between the back side of the first case frame and the front side of the second case frame,
wherein the plurality of electronic components are disposed directly adjacent to the back side of the first case frame,
wherein the electrical connecting member is mounted in a guide slit formed in the back side of the first case frame, without protruding from the back side of the first case frame, and
wherein the plurality of electronic components include an ultrasonic sensor module.

15. A protective cover comprising:
a case including:
a first case frame forming a front surface of the protective cover, the front surface providing a recess for mounting an electronic device, and
a second case frame forming a back surface of the protective cover and coupled to the first case frame;
an ultrasonic sensor module disposed in the case;
a connector electrically connected to the electronic device when the electronic device is mounted on the recess; and
a conductive path disposed in the case and electrically connecting the ultrasonic sensor and the connector,
wherein the ultrasonic sensor module and the connector are disposed directly adjacent to a back side of the first case frame, and
wherein the conductive path is mounted in a guide slit formed in the back side of the first case frame, without protruding from the back side of the first case frame.

16. The protective cover of claim 15, wherein the conductive path includes a flexible printed circuit.

17. The protective cover of claim 15, wherein the ultrasonic sensor module is provided with power and control signals from the electronic device.

18. The protective cover of claim 15, further comprising:
a port pluggable an external electronic device via a surface of the case and electrically connected to the connector, wherein the electronic device is electrically connected to the external electronic device via the connector when the external electronic device is plugged in the port.

19. The protective cover of claim 15, wherein the case includes a first part laterally surrounding at least a part of a side surface of the electronic device, a second part covering at least a part of a rear surface of the electronic device, and a third part extended laterally from the first part, wherein the ultrasonic sensor module is disposed in the third part.

* * * * *